United States Patent [19]
Ohsawa et al.

[11] Patent Number: 5,388,192
[45] Date of Patent: Feb. 7, 1995

[54] IMAGE LAYOUT PROCESSING METHOD AND APPARATUS

[75] Inventors: Ikuo Ohsawa; Haruo Nakagawa; Hiroshi Murayama; Naoki Nabeshima, all of Kyoto, Japan

[73] Assignee: Dainippon Screen Mfg. Co., Ltd., Kyoto, Japan

[21] Appl. No.: 826,728

[22] Filed: Jan. 28, 1992

[30] Foreign Application Priority Data

Jan. 30, 1991 [JP] Japan .................................. 3-32009

[51] Int. Cl.⁶ ........................................... G06F 15/62
[52] U.S. Cl. ..................................... 395/135; 395/146
[58] Field of Search ............... 395/146, 135, 131, 158; 340/703, 721

[56] References Cited

U.S. PATENT DOCUMENTS

| | | | |
|---|---|---|---|
| 4,853,681 | 8/1989 | Takashima | 340/703 |
| 4,868,552 | 9/1989 | Chang | 340/721 |
| 4,954,818 | 7/1990 | Nakane et al. | 395/158 |
| 5,185,858 | 2/1993 | Emery et al. | 395/158 |

FOREIGN PATENT DOCUMENTS

| | | |
|---|---|---|
| 0396377 | 11/1990 | European Pat. Off. . |
| 0431754 | 6/1991 | European Pat. Off. . |
| 2-213898 | 8/1990 | Japan . |

OTHER PUBLICATIONS

Goldwasser, "A Generalized Segment Display Processor Architecture," 1981 IEEE Computer Society Workshop on Computer Architecture for Pattern Analysis and Image Database Management, U.S.A. (Nov. 11, 1981) pp. 301–308.

*Primary Examiner*—Heather R. Herndon
*Assistant Examiner*—Mike Smith
*Attorney, Agent, or Firm*—Lowe, Price, LeBlanc & Becker

[57] ABSTRACT

An image layout processing method for simulating on a display screen an arrangement of a plurality of image objects to be transferred to a prepress mechanical. An image memory plane is divided into a ground area, a key object area, and a display work area. A plurality of objects other than a key object fetched from an external storage are written as priority data to the ground area in an order of priority for superposition of the objects. Data of a selected key object are written to the key object area. The data in the ground area are unconditionally copied to the display work area, while the data in the key object area are copied to a designated position in the display work area with a condition based on a designated priority. Respective pixel data successively read from the display work area are converted by a lookup table into color data to be displayed on a cathode ray tube (CRT) whereby the key object is presented as inserted between desired objects.

10 Claims, 18 Drawing Sheets

| | ground area | key object area |
|---|---|---|
| 15 | | |
| | display work area "1" | display work area "2" |

| input data | output values | | | |
|---|---|---|---|---|
| | R | G | B | |
| 0 | 1 | 1 | 1 | white (ground color) |
| 1 | 1 | 0 | 0 | red |
| 2 | 0 | 1 | 0 | green |
| 3 | 0 | 0 | 1 | blue |
| 4 | 1 | 1 | 0 | yellow |
| 5 | 1 | 0 | 1 | magenta |
| 6 | 0 | 1 | 1 | cyan |
| 7 | 0 | 0 | 0 | black |

| input data | output values | | | |
|---|---|---|---|---|
| | R | G | B | |
| 0 | 1 | 1 | 1 | white(ground color) |
| 1 | 1 | 0 | 0 | red |
| 2 | 0 | 1 | 0 | green |
| 3 | 0 | 0 | 1 | blue |
| 4 | 0 | 0 | 0 | black |
| 5 | 1 | 1 | 0 | yellow |
| 6 | 1 | 0 | 1 | magenta |
| 7 | 0 | 1 | 1 | cyan |

| input data | output values | | | | |
|---|---|---|---|---|---|
| | transparent | R | G | B | |
| 0 | 0 | 1 | 1 | 1 | white(ground color) |
| 1 | 0 | 1 | 0 | 0 | red |
| 2 | 0 | 0 | 1 | 0 | green |
| 3 | 1 | indefinite | | | transparent(picture) |
| 4 | 0 | 1 | 1 | 0 | yellow |
| 5 | 1 | indefinite | | | transparent(picture) |
| 6 | 0 | 0 | 1 | 1 | cyan |
| 7 | 1 | indefinite | | | transparent(picture) |

| continuous tone data | output values | | |
|---|---|---|---|
| | R | G | B |
| 0 | 0 | 0 | 0 |
| 1 | 1 | 1 | 1 |
| 2 | 2 | 2 | 2 |
| ⋮ | ⋮ | ⋮ | ⋮ |
| $2^{m-1}-1$ | $2^{m-1}-1$ | $2^{m-1}-1$ | $2^{m-1}-1$ |
| $2^{m-1}$ | 0 | 0 | 0 |
| $2^{m-1}+1$ | 1 | 1 | 1 |
| $2^{m-1}+2$ | 2 | 2 | 2 |
| ⋮ | ⋮ | ⋮ | ⋮ |
| $2^{m-1}-1$ | $2^{m-1}-1$ | $2^{m-1}-1$ | $2^{m-1}-1$ |

16B continuous tone ground area binary key object area continuous tone key object area continuous tone display work area "1"

CRT screen

IMAGE LAYOUT PROCESSING METHOD AND APPARATUS

BACKGROUND OF THE INVENTION

(1) Field of the Invention

The present invention relates to an image layout processing method for simulating on a CRT screen an arrangement of graphics, pictures, characters and the like (hereinafter referred to as objects) to be transferred to a prepress mechanical, and more particularly to a method of and apparatus for moving a key object as inserted between other objects displayed on the CRT screen.

(2) Description of the Related Art

The manner of moving a key object between other objects on a screen according to a conventional image layout processing method of this type will be described with reference to FIG. 1.

In FIG. 1, numeral 1 denotes an image memory plane on which a background object A is recorded (hereinafter referred to as a background memory plane). Numeral 2 denotes an image memory plane on which a key object B is recorded (hereinafter referred to as a key object memory plane). Numeral 3 denotes an image memory plane on which a foreground object C is recorded (hereinafter referred to as a foreground memory plane). Priorities are predetermined for the memory planes 1-3 based on overlapping conditions of the objects A-C. In this example, priorities are set in the descending order from memory plane 3 to memory plane 1.

The memory planes 1-3 are read in synchronized raster scans successively from respective leading addresses S1-S3. Pixel data read from the memory planes 1-3 are applied to a multiplexer 4 in a next stage. When the pixel data read from the memory planes 1-3 are all "ON", the multiplexer 4 selects and outputs the pixel data from the memory plane of the highest priority. If the pixel data from the memory plane of higher priority are "OFF", the multiplexer 4 outputs the pixel data from the memory plane of the next priority.

By fetching the pixel data from the memory planes 1-3 through the multiplexer 4 in this way, the objects A-C are presented overlapping one another on a display screen 5. As shown in FIG. 1, the leading address S2 for the raster scan of the key object memory plane 2 may be shifted to S2' while fixing the leading addresses S1 and S3 in the background memory plane 1 and foreground memory plane 3. This step allows the key object B to be moved between the background object A and foreground object C.

However, the conventional method described above has the following disadvantages.

The conventional method requires a plurality of image memory planes corresponding to the number of objects in order to display the objects overlapping one another on a CRT screen. Since these image memory planes must be raster-scanned independently of one another, an image processing apparatus implementing this method inevitably has a complicated construction. Complication and high cost of the apparatus may also be ascribed to the complexity of the multiplexer which selects the pixel data received from the respective memory planes according to the priorities.

Further, when an attempt is made in the prior method to display the key object B of FIG. 1 in front of the foreground object C, image data must be rewritten for exchange between the key object memory plane 2 and foreground memory plane 3, or the image data of the key object B must be written to an additional memory plane of higher priority than the foreground memory plane 3. This is an irksome operation in either case.

SUMMARY OF THE INVENTION

The present invention has been made having regard to the state of the art noted above, and intends to provide an image layout processing method and apparatus for moving a key object as inserted between other objects on a display screen, which requires use of few image memory planes, and for facilitating changes of object overlaps.

In one aspect of the invention, as defined in claim 1, an image layout processing method is provided for simulating on a display screen an arrangement of a plurality of binary image objects to be transferred to a prepress mechanical, the method comprising:

a first step of converting data of the objects other than a key object into priority data fixed thereto and corresponding to predetermined priorities for superposition, and successively writing the priority data to designated positions in a ground area acting as storage means;

a second step of converting data of the key object to appropriate key object data determined in relation to the priority data, and writing the key object data to a key object area acting as a further storage means;

a third step of unconditionally copying the priority data from the ground area to a display work area acting as a still further storage means;

a fourth step of comparing a priority assigned to the key object with the priority data of pixels in the display work area in copying the key object data from the key object area to a designated position in the display work area, and copying the key object data of pixels in the key object area corresponding to the pixels in the display work area to positions of the pixels in the display work area when the priority data of the pixels in the display work area are substantially lower than the priority of the key object; and a fifth step of successively reading data of the pixels in the display work area resulting from the fourth step, and converting the data into predetermined color data for presentation on display means.

Preferably, in the above image layout processing method, the display work area is divided into two sub-areas for alternate use in executing the third through fifth steps when an instruction is given to change the priority of the key object or to move the key object.

According to the present invention, comparison is made between the priority data of the objects unconditionally copied to the display work area and the priority of the key object designated by the operator. If the priority data of pixels in the display work area are lower than the priority of the key object, key object data of corresponding pixels in the key object area are copied to positions of those pixels in the display work area. The priority data higher than the priority of the key object remain as they are in the display work area. Thus, the operator may cause the key object to be displayed between desired objects by assigning a selected priority to the key object. Since the key object is copied to a designated position on the display work area, the operator may place the key object in any position between desired objects by varying the designated position.

According to the present invention, therefore, an increase in the number of objects to be arranged on the mechanical may be accommodated by increasing the number of priority data. It is unnecessary to provide additional image memory planes as in the prior art, thereby realizing a simplified apparatus.

A change in the order of overlapping of the key object may be dealt with by conditionally copying the key object to the display work area after varying the priority of the key object data. This dispenses with the irksome rewriting of the memory as in the prior art, to simplify and expedite the processing accordingly.

Where two display work areas are used, the data may be copied alternately to the two display work areas with or without conditions when an instruction is given to change the priority of the key object or to move the key object. Consequently, contents the display work area undergoing a data rewriting process are not shown on the display. This enables a high quality image presentation free from flickering on a display screen due to rewriting to the display work area.

In a further aspect of the present invention, as defined in claim 5, an image layout processing method is provided for simulating on a display screen an arrangement of a plurality of image objects including continuous tone image objects to be transferred to a prepress mechanical, the method comprising:

a first step of superposing priority data fixed to binary image objects other than a key object and corresponding to predetermined priorities for super position, and priority mask data of continuous tone image objects other than the key object, successively in an order of priority on designated positions in a binary ground area acting as storage means;

a second step of superposing continuous tone data of continuous tone image objects other than the key object in the order of priority on designated positions in a continuous tone ground area acting as a further storage means;

a third step of writing mask data of the key object in a binary key object area acting as a still further storage means when the key object is a continuous tone image object;

a fourth step of writing continuous tone data of the key object in a continuous tone key object area acting as a still further storage means, and setting the most significant bit (MSB) of the continuous tone data for pixels in the continuous tone key object area corresponding to pixels in the binary key object area having the mask data in ON state, when the key object is a continuous tone image object;

a fifth step of reading the priority data and priority mask data from the binary ground area (the two types of data being hereinafter collectively called binary ground data), comparing the binary ground data of respective pixels with the priority assigned to the key object, and setting the most significant bit (MSB) to pixels in the continuous tone ground area corresponding to the pixels when the binary ground data are substantially higher than the priority assigned to the key object;

a sixth step of unconditionally copying the data from the binary ground area and the continuous tone ground area to a binary display work area and a continuous tone display work area acting as still further storage means, respectively;

a seventh step of copying the mask data from the binary key object area to a designated position in the binary display work area such that, when the binary ground data of pixels in the binary display work area are substantially lower than the priority assigned to the key object, the mask data of the pixels in the binary key object area corresponding to the pixels are copied to corresponding pixel positions in the binary display work area;

an eighth step of copying the continuous tone key object data from the continuous tone key object area to a designated position in the continuous tone display work area such that the continuous tone data of the pixels to which the most significant bit (MSB) of the continuous tone key object data is set are copied only to positions of pixels in the corresponding continuous tone display work area to which the most significant bit (MSB) is not set; and a ninth step of synchronously reading data of the binary display work area and the continuous tone display work area resulting from the seventh and eighth steps such that-, when the data read from the binary display work area are the priority data of the binary image objects, the priority data are converted into predetermined color data for display on display means, and when the data read from the binary display work area are the priority mask data of the continuous tone image objects and the mask data of the key object, continuous tone images are displayed on the display means based on the continuous tone data read from the continuous tone display work area.

Preferably, each of the binary display work area and the continuous tone display work area is divided into two subareas for alternate use in executing the fifth through ninth steps when an instruction is given to change the priority of the key object. When an instruction is given to move the key object, the sixth through ninth steps are executed by using the two subareas of each display work area.

According to this method, the binary display work area is used for writing priority data fixed to binary image objects other than the key object, priority mask data of continuous tone image objects other than the key object, and mask data of the continuous tone key object, as superposed with conditions based on a designated order of priority. The continuous tone display work area is used for writing continuous tone data of the continuous tone image objects other than the key object, and continuous tone data of the key object, as superposed with conditions based on the order of priority. When synchronously reading pixels in the binary and continuous tone display work areas, the priority data fixed to the binary image objects are converted into their own color data for output. On the other hand, when the priority mask data or mask data are read from the binary display work area, the continuous tone data read from the continuous tone display work area are outputted. Consequently, the designated continuous tone key object is presented on the display as inserted between desired objects. The continuous tone key object may be moved to a desired position for display by designating its copying position when copying the data from the binary/continuous tone key object areas to the binary/continuous tone display work areas, respectively.

According to the present invention, therefore, the continuous tone key object may be displayed as inserted and moved between other objects by a relatively simple system.

BRIEF DESCRIPTION OF THE DRAWINGS

For the purpose of illustrating the invention, there are shown in the drawings several forms which are presently preferred, it being understood, however, that the invention is not limited to the precise arrangements and instrumentalities shown.

FIG. 15 is a schematic view showing updated contents of the lookup table;

FIG. 17 is a schematic view showing a lookup table of binary data;

FIG. 18 is a schematic view showing a lookup table of continuous tone data;

DETAILED DESCRIPTION OF THE PREFERRED EMBODIMENTS

Preferred embodiments of the present invention will be described in detail hereinafter with reference to the drawings.

First Embodiment

Figure 1:
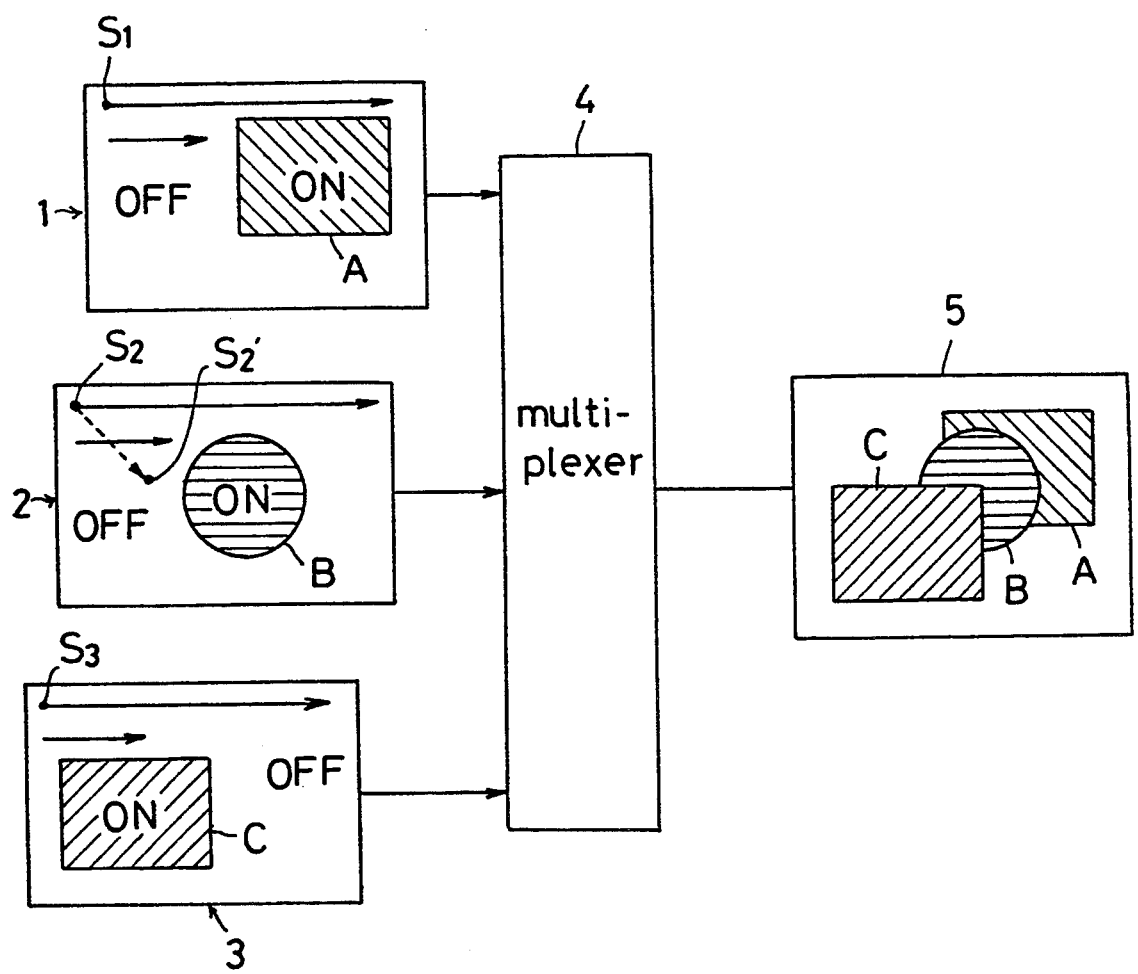
FIG. 1 is a block diagram showing an outline of a conventional apparatus.
Figure 2:
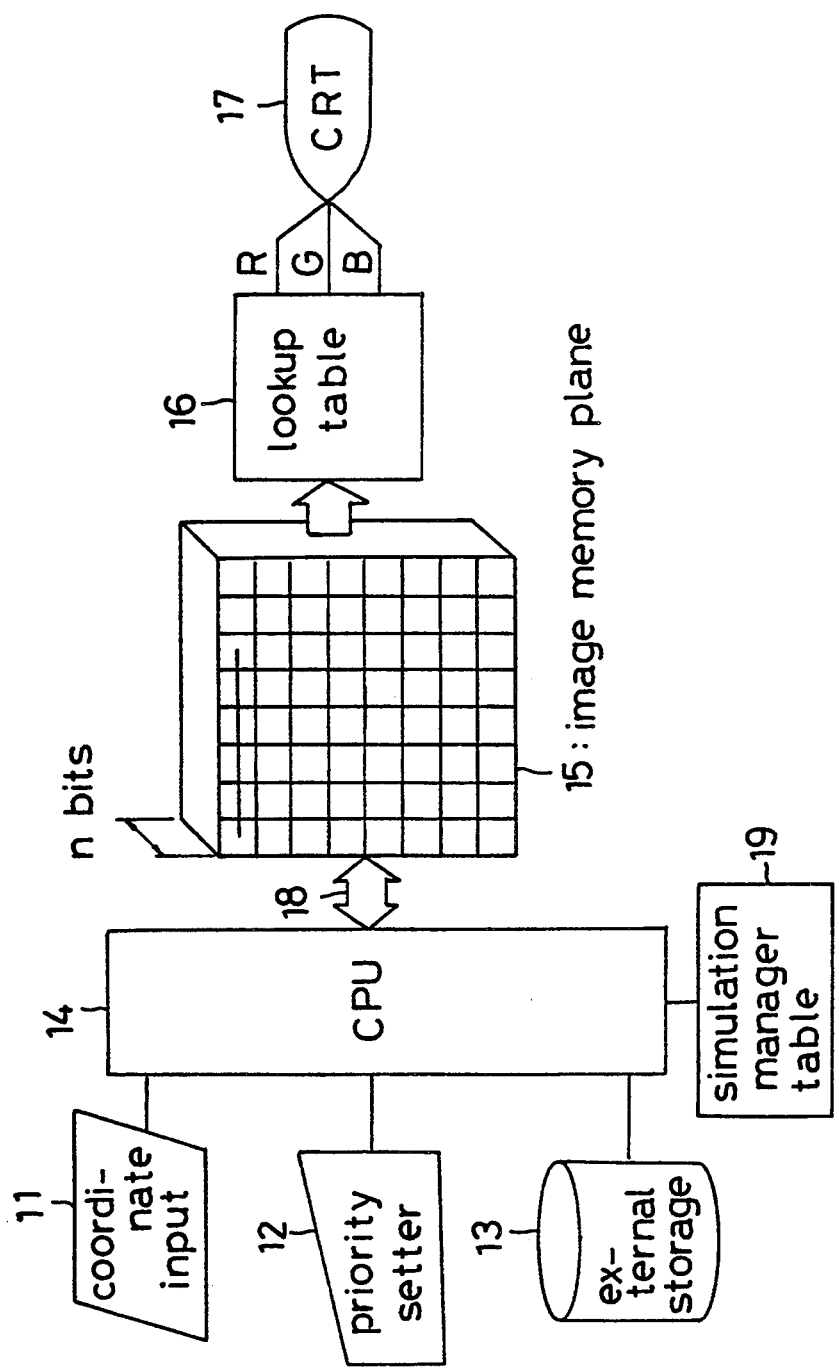
FIG. 2 is a block diagram showing an outline of an image layout processing apparatus in a first embodiment of the present invention.

This embodiment is an image layout processing method which handles binary images such as graphics and characters as objects. FIG. 2 is a block diagram showing an outline of an image layout processing apparatus for implementing the processing method in this embodiment.

In FIG. 2, a coordinate input device 11 is used for instructing selection or movement of objects and designating various operating menus presented on the screen of a CRT 17. This input device 11 may be a digitizer, mouse or track ball.

A priority setter 12 comprises a keyboard, dial or the like used for assigning a priority to a key object. As an alternative to this priority device, icons or the like may be displayed on the screen of CRT 17 for a priority to be assigned to a key object through the coordinate input device 11.

An external storage 13 stores data of a plurality of binary image objects such graphics, characters and the like to be arranged on a mechanical or ground screen displayed on the CRT 17. The external storage 13 may be a magnetic disk, magnetic tape or magneto-optical disk, for example. A mechanical manufacturing apparatus or the like may be connected through a network for use instead of or in combination with the external storage 13. The data of various objects are in the form of runlength, bitmap or outline vector data, which are converted by a CPU 14 into ON/OFF binary images. At a time of this conversion, the operator may select magnification ratios of the objects on the CRT screen through a keyboard or through a menu manipulation on the screen.

Besides the conversion of the graphic and character data into binary images, the CPU 14 carries out various operations for converting the "ON" and "OFF" of the binary image data into n-bit data (hereinafter referred to as priority data) according to predetermined priorities for displaying the respective objects, writing these priority data to designated pixel positions in an image memory plane 15 described later, whereupon the priority data form image data (hereinafter referred to as priority image data), and moving the key object between other objects based on the priority image data. These operations of the CPU 14 will be described in detail later.

The image memory plane 15 is a two-dimensional image memory having an n-bit depth. The CPU 14 makes raster scans of selected regions in the image memory plane 15 through a bus 18, to write or read the priority image data to/from these regions.

Figures 3, 4:
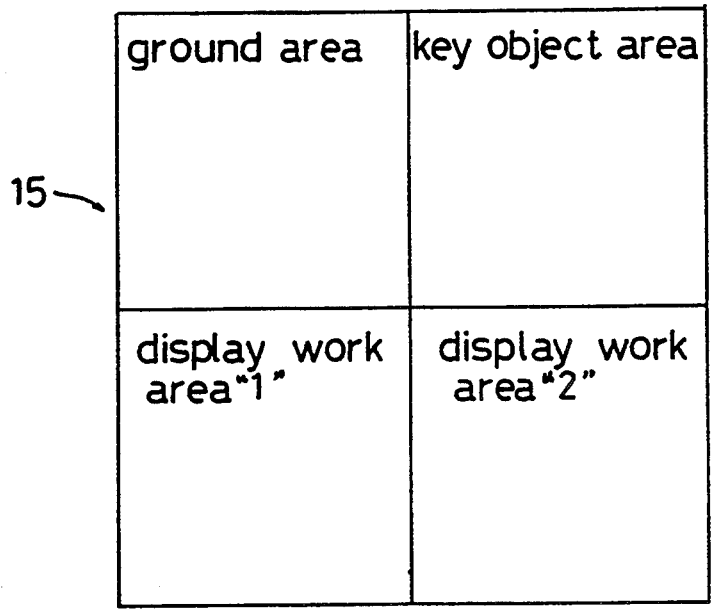
FIG. 3 is a schematic view of an image memory plane.
FIG. 4 is a schematic view of a lookup table.

As shown in FIG. 3, the image memory plane 15 is divided into four areas, which are a ground area, a key object area, a display work area "1" and a display work area "2". The ground area is an area for superposing the priority image data of all the objects except the key object to be arranged on a mechanical. The key object area is an area for writing appropriate key object data determined in relation to the priority image data. The display work areas "1" and "2" are areas for combining a plurality of object data for display on the CRT 17, by copying with certain conditions the priority image data and key object data from the ground area and key object area. The ground area and key object area do not serve directly to the purpose of displaying the images on the CRT 17. It is therefore not essential for the image memory plane 15 to include these areas, but a memory such as a CPU memory not contributing to the screen display may be used instead.

A lookup table 16 is a memory for enabling a color display of the objects which are binary images. The lookup table 16 stores output values of red (R), green (G) and blue (B) corresponding to values of the n-bit priority data and key object data of the pixels successively read through a raster scan of the image memory plane 15 and applied to the lookup table 16 as input addresses. Color data including R, G and B values are outputted from the lookup table 16 to the color CRT 17.

FIG. 4 shows an example of lookup table 16 which outputs 1-bit color data of each of R, G and B in response to 3-bit input data ("0" to "7" serving also as call addresses). Where over eight objects are to be displayed in overlaps, the number of bits for the input data, i.e. the priority data and key object data, or the depth of the image memory plane 15, may be increased to 4 or more bits, with each of the R, G and B values outputted in data of 2 or more bits to provide an increased number of colors for display.

A simulation manager table 19 controlled by the CPU 14 is used for handling the objects put to the layout simulation by this apparatus, and storing results of the simulation. Specifically, the simulation manager table 19 holds the following items:

(1) Priorities: These represent a superposing order (priority data) of the objects arranged on the mechanical, which is subject to variations resulting from superposing order change simulations carried out by this apparatus.

(2) Object Names: These are file names given to the objects stored in the external storage 13.

(3) Offsets: These are differences between the objects and an original point (reference point) set to a selected corner of the mechanical, which are subject to variations resulting from arrangement change simulations carried out by this apparatus.

(4) Sizes: These are vertical and transverse dimensions of the objects, which are used in determining regions for conditional copying to be described later.

(5) Attributes: These indicate whether the objects are in binary data or continuous tone data.

(6) Applications: These indicate general features of the objects, e.g. mechanical, tint, characters, gradation, pictures, logos, etc.

(7) Colors: These are colors in binary data for display, which are set to the lookup table 16.

Figure 6:
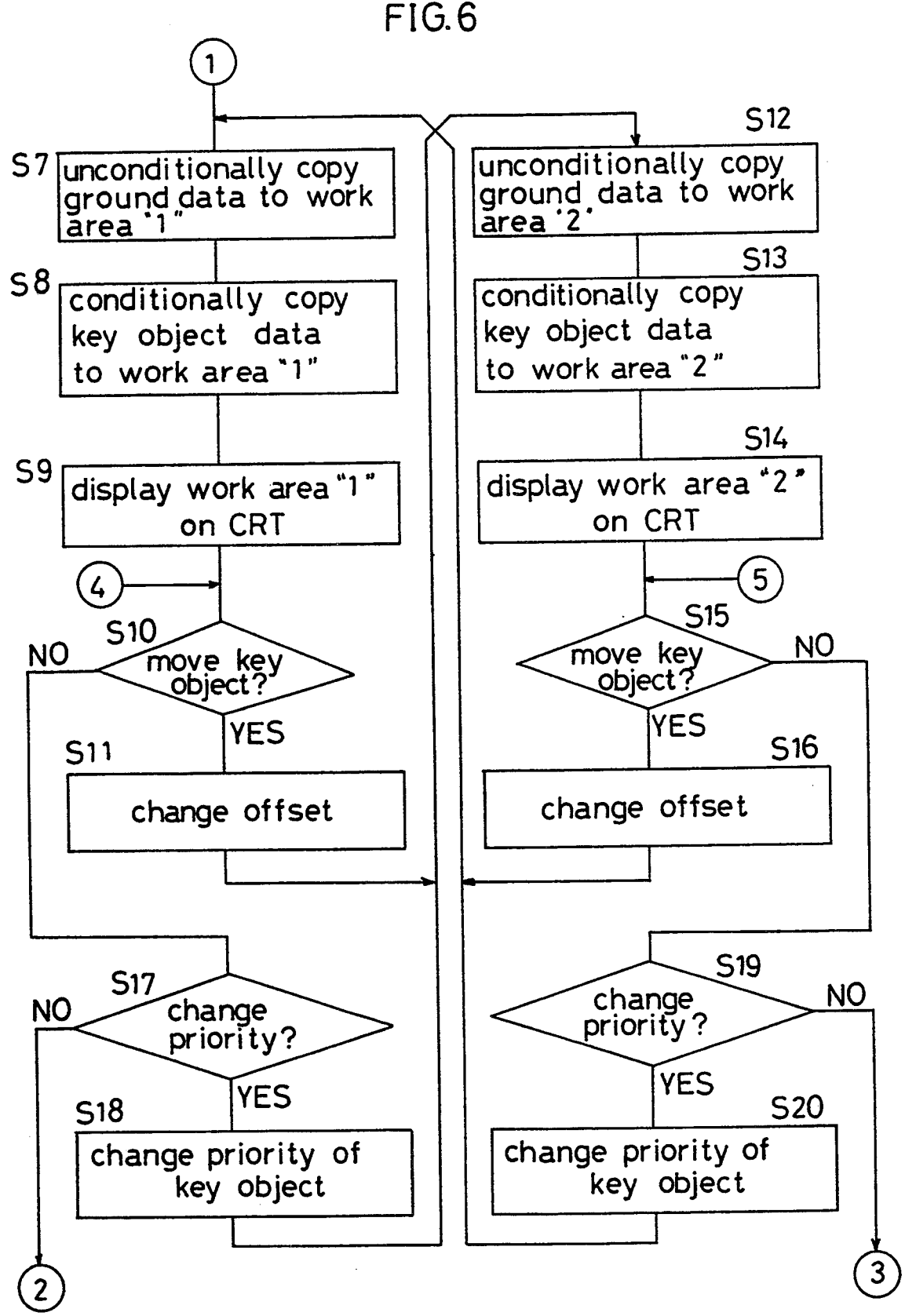
FIG. 6 is another partial flowchart of the processing sequence in the first embodiment.
Figure 7:
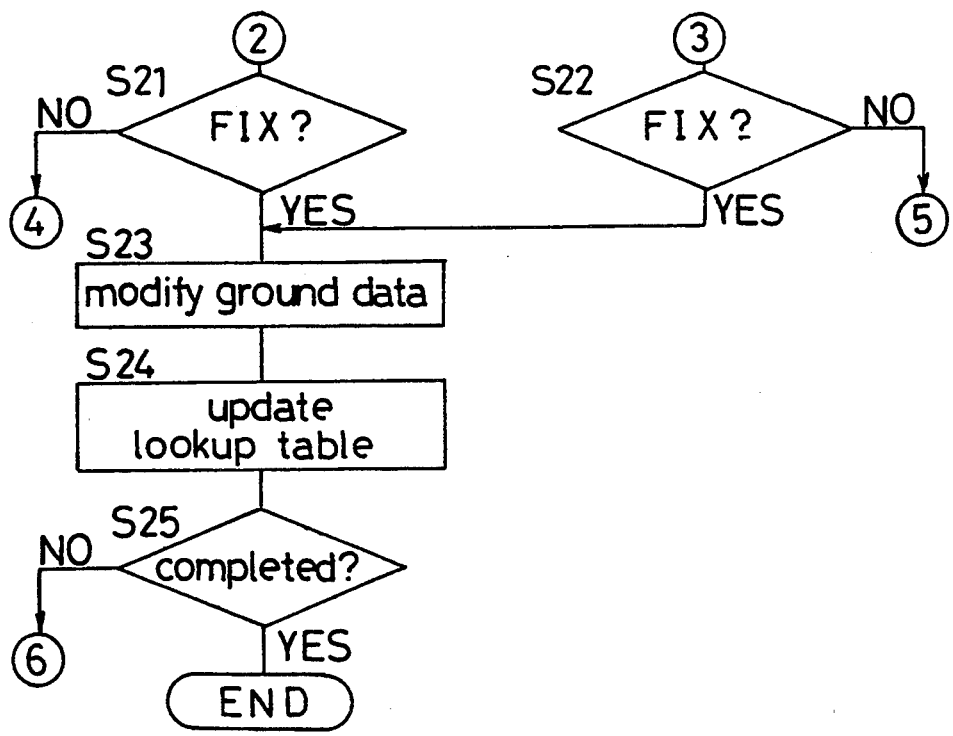
FIG. 7 is a further partial flowchart of the processing sequence in the first embodiment.

Operations of the above layout processing apparatus will be described with reference to the flowchart shown in FIGS. 5 through 7.

First, all data in the image memory plane 15 are cleared, and relations between the input data and R, G, B output values of the lookup table 16 are initialized with reference to the simulation manager table 19 (steps S1 and S2).

Next, the priority data of objects except the key object are written to the ground area of the image memory plane 15 (step S3). The priority data of objects written to the ground area are hereinafter referred to as "ground data". Particulars of step S3 are as follows. First, the operator selects an object to be placed on the mechanical from the objects stored in the external storage 13, by manipulating menus on the CRT screen through the coordinate input device 11. The object data read from the external storage 13 are converted into binary image data, and then into priority image data reflecting predetermined priorities by the CPU 14. In this embodiment, the priority data are set so that the objects have progressively higher priorities as they are designated.

When a next object is designated, the priority data of this object are written to the ground area of the image memory plane 15. With regard to the region where the object designated first and the one designated next overlap one another, the priority data of the second object are written over those of the first object since the second object has a higher priority than the first object.

Figure 8:
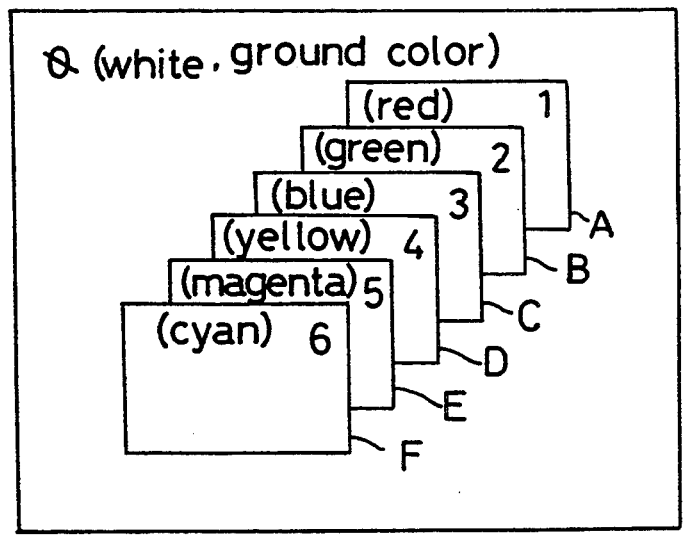
FIG. 8 is a schematic view of ground data written to a ground area.

Thereafter the objects other than the key object are similarly designated one after another, with the priority data written to the ground area in the order of designation. FIG. 8 shows an example of ground data written to the ground area. Although the respective objects are shown in rectangular form in FIG. 8, naturally the characters, logos and pictures in the objects have their own shapes. Numerals 1 to 6 affixed to the objects A—F denotes the n-bit priority data written into the respective image regions in accordance with the priorities of the objects. Numeral 0 denotes the priority data of a ground color.

After the ground data are written to the ground area of the image memory plane 15 as above, the operator selects a desired object as a key object from the objects stored in the external storage 13, by manipulating the menus on the CRT screen through the coordinate input device 11 (step S4).

The key object data are likewise converted into a binary image data and then into a priority image data by the CPU 14. In this embodiment, the key object data are set to "$2^n-1$" since the priority data of the other objects are in n-bit and expressed in "0" to "$2^n-2$". The priority data of the key object are set to "$2^n-1$" in order to use the last address in the lookup table 16 for coloring the key object. This eliminates the necessity to update the contents of the lookup table 16 already used for coloring the other objects. Consequently, the key object data are of a provisional nature and set at this stage for expediency rather than indicating a priority in object superposition as distinct from the priority data of the other objects. The priority of the key object are determined by an operation described later.

Figure 9:
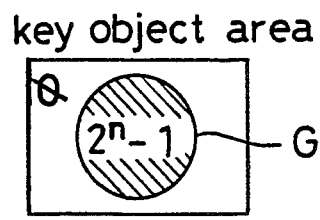
FIG. 9 is a schematic view of key object data written to a key object area.

The key object data are written to the key object area of the image memory plane 15 (step S5). FIG. 9 schematically shows the data of key object G written to the key object area. The hatched portion of FIG. 9 represents a binary image region where the key object data are set to "$2^n-1$". The surrounding "0" region may be called a base or background region of the key object, for example, which is of the lowest priority and imparts no influence on images of the other objects as will be apparent from processing described later.

Next, the operator operates the priority setter 12 to initialize priority P of the key object and to initialize offset OF of the key object from an original point on the mechanical (step S6). By setting the offset OF to an appropriate value, the key object may be moved to a desired initial position on the mechanical. As will be apparent from the description made hereinafter, setting priority P of the key object means insertion of the key object between an object having priority P+1 and an object having priority P set earlier.

When the priority and offset of the key object have been initialized, the CPU 14 copies the ground data intact (unconditionally) from the ground area to the display work area "1" of the image memory plane 15 (step S7).

Next, the CPU 14 copies the key object data from the key object area of the image memory plane 15 to a position of offset OF in the display work area "1" (step S8). This copying is carried out with the condition that, for pixels having key object data other than "0" (i.e. having key object data "$2^n-1$"), the key object data "$2^n-1$" are copied to corresponding pixel positions in the display work area "1" only if the priority data of these pixels are P or less.

Figure 10:
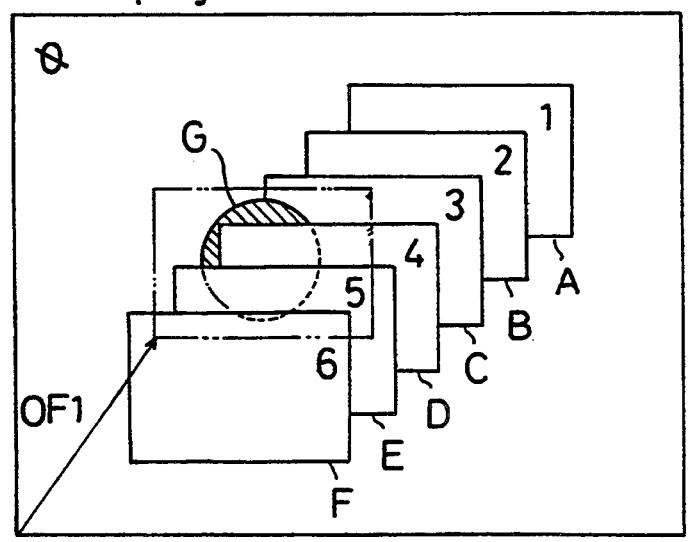
FIG. 10 is a schematic view of data copied to a display work area "1"

As a result of this copying operation, the key object data are written into an object region in the display work area "1" where the priority data are P or less. The ground data remain as they are in regions where the priority data are P+1 or more. This means that the key object data are inserted between priority data P+1 and priority data P. FIG. 10 schematically shows the data combined in the display work area "1". In this example, the priority P of the key object G is set to "3", and therefore the key object G is inserted between object C having priority data "3" and object D having priority data "4". The key object G has an offset OF1 in this case.

Next, with a raster scan starting address set to the display work area "1", the CPU 14 successively reads the priority data of the pixels in the display work area "1". The priority data read are converted by the lookup table 16 into their own R, G, B values for display on the CRT 17 (step S9). Take the lookup table 16 of FIG. 4 for example, the ground is painted white, object A red, object B green, object C blue, object D yellow, object E magenta, object F cyan, and key object G black.

When the operator instructs movement of the key object G through the coordinate input device 11 (step S10), the CPU 14 changes offset OF1 of the key object data (step S11). Then, the CPU 14 copies the ground data intact (unconditionally) from the ground area of the image memory plane 15 to the display work area "2" (step S12). Next, the CPU 14 copies the key object data with the same condition noted hereinbefore from the key object area to a position of new offset OF2 in the display work area "2" (step S13). After the conditional copying of the key object data, the contents of the display work area "2" are displayed on the CRT 17 as described hereinbefore (step S14).

If a further instruction is given to move the key object G (step S15), the CPU 14 changes offset OF2 of the key object data (step S16). Thereafter the operation returns to step S7 for unconditionally copying the ground data to the display work area "1", which is followed by step S8 for conditionally copying the key object data to the display work area "1", and step S9 for displaying the display work area "1" on the CRT 17.

Figure 11:
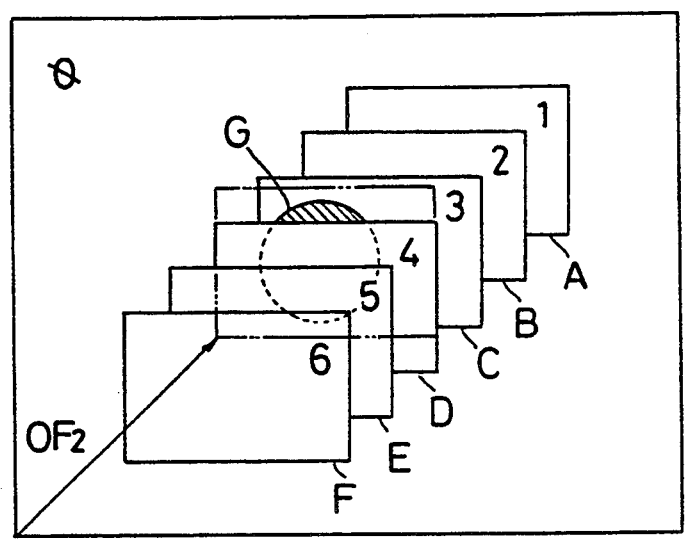
FIG. 11 is a schematic view showing a way in which a key object is moved by an offset change.
Figure 12:
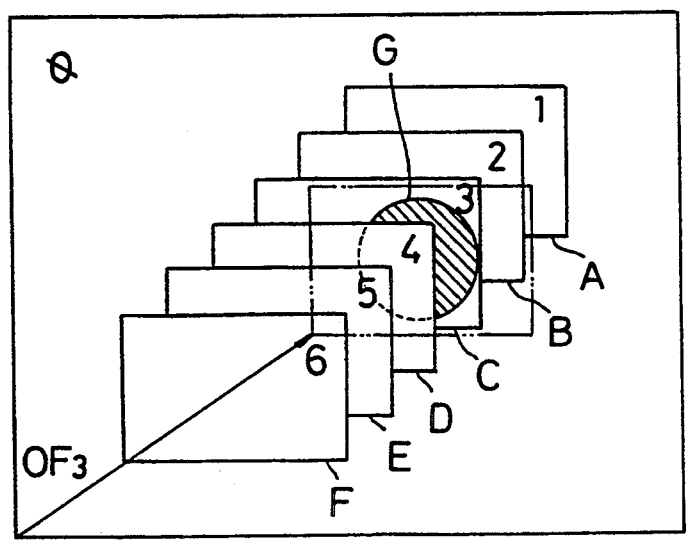
FIG. 12 is a schematic view showing another example in which the key object is moved by an offset change.

By changing the offset as above, the key object G may be displayed and moved between selected objects. FIGS. 10 through 12 show movement of the key object G resulting from the changes of the offset (from OF1 to OF3).

The movement of the key object between other objects is displayed by alternately using the display work areas "1" and "2" for the following reason. Where the movement of the key object between other objects is displayed by using a single display work area, the images displayed on the CRT screen flicker during data rewriting to the display work area. The alternating use of the display work areas "1" and "2" has the advantage of avoiding the flickering on the screen since the contents of the display work area in a rewriting process are not displayed.

Figure 13:
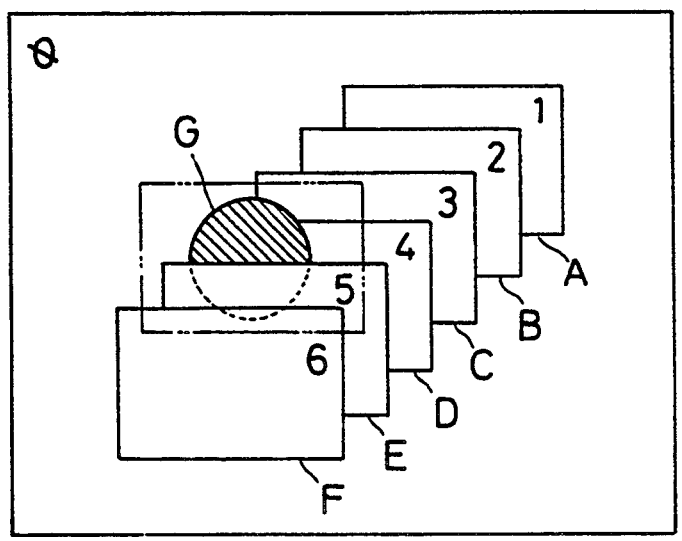
FIG. 13 is a schematic view showing a way in which overlapping of the key object is changed with a variation of priority.
Figure 14:
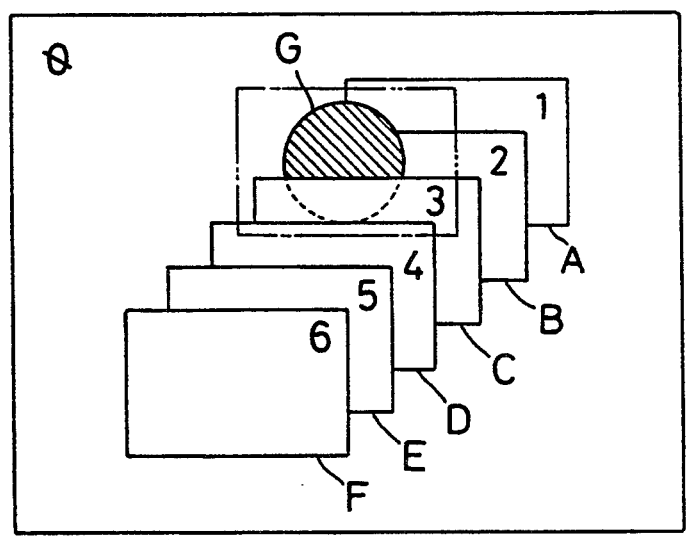
FIG. 14 is a schematic view showing a different way in which overlapping of the key object is changed with a variation of priority.

An instruction may be given to change the priority of the key object when the contents of the display work area "1" are displayed on the CRT 17 (step S17). Then, the CPU 14 changes the priority P of the key object data (step S18). Next, the CPU 14 unconditionally copies the ground data to the display work area "2" (step S12), and copies the key object data, with the condition based on the new priority, to the display work area "2" (step S13). The contents of the display work area "2" are displayed on the CRT 17 (step S14). When, for example, the priority P of the key object data is raised from "3" to "4", the key object G moves between object D and object E. When the priority P of the key object data is lowered from "3" to "2", the key object G moves between object B and object C. It should be noted, however, that FIGS. 13 and 14 show the key object G with different offsets for convenience of illustration.

Similarly, an instruction may be given to change the priority of the key object when the contents of the display work area "2" are displayed on the CRT 17 (step S19). Then, the CPU 14 changes the priority P of the key object data (step S20), and returns to step S7 for rewriting the contents of the display work area "1".

When the key object has moved to a desired position, the operator manipulates the coordinate input device 11 to input an instruction to rewrite and fix the data in the display work area as ground data (hereinafter referred to as a FIX instruction) (steps S21 and S22). As a result, the ground data are revised as follows (step S23).

Assume, for example, that a FIX instruction is given in the state shown in FIG. 10. Although, in this case, the designated priority P of the key object G is "3", the key object data are set to "7" ($2^n-1$) for expediency. In order to move and display a different key object as inserted between other objects, it is necessary to rewrite the previous key object data and the priority data of the objects of higher priorities than the previous key object in accordance with the order of image superposition. There are three data rewriting methods as follows:

(1) In the first method, the CPU 14 scans and reads the contents of the display work area "1" or "2" displayed when the FIX instruction is given, rewrites the key object data ($2^n-1$) to P+1 (which is "4" in this example), and adds "1" to the priority image data of the objects (which are objects D, E and F) of higher priorities than the key object G. That is, the priority image data of object D are rewritten from "4" to "5", those of object E from "5" to "6", and those of object F from "6" to "7". The data thus rewritten are superposed in the ground area.

(2) In the second method, the priority image data in the key object area are rewritten from "7" to "4", and the priority image data "4" or more of the objects in the ground area are incremented by "1". The changed ground data are unconditionally copied, and the changed key object data conditionally copied, to the display work area. That is, the priority image data "5" and above are retained as they are in the display work area, and the priority image data "3" and less are over-written by the key object data "4". The data of the display work area thus obtained are superposed again in the ground area.

Figure 5:
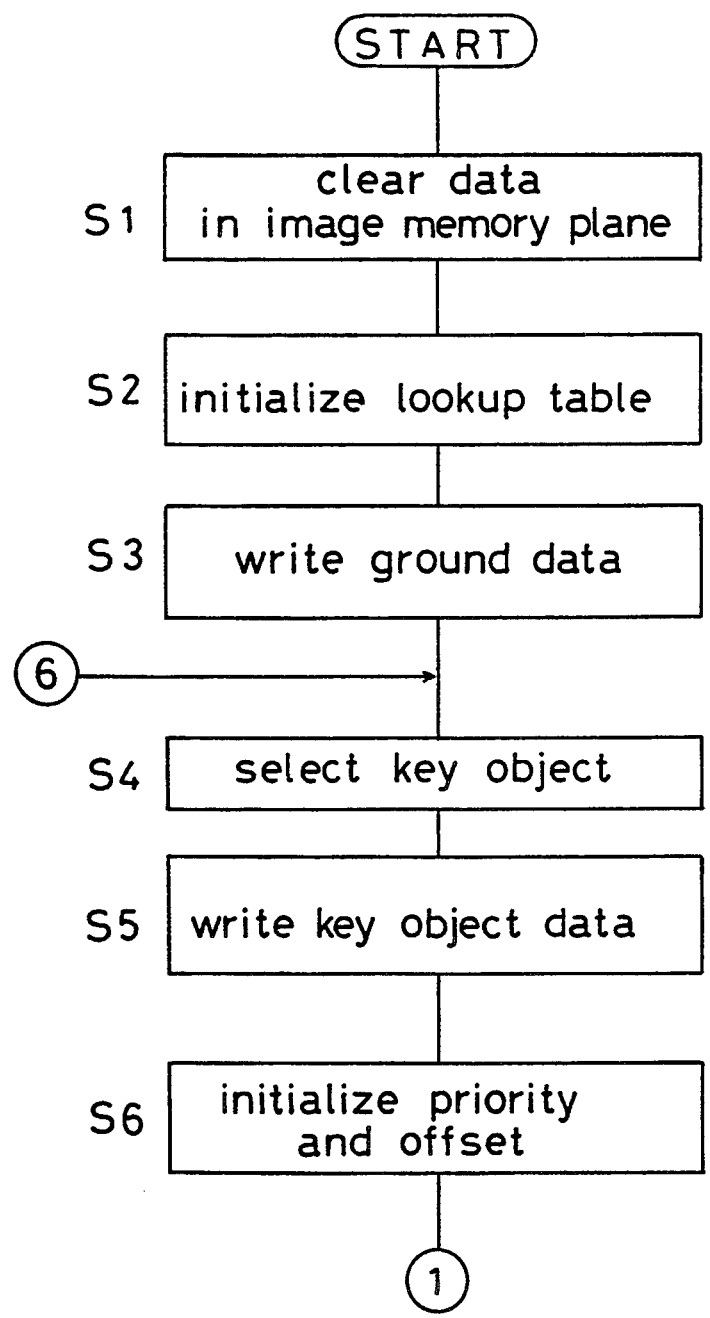
FIG. 5 is a partial flowchart of a processing sequence in the first embodiment.

(3) As the third method, the operation shown in FIG. 5 may be carried out all over again after changing the priorities of the objects in the simulation manager table 19 on the results of simulation.

After revision of the ground data, the lookup table 16 is updated in accordance of the above-noted changes of the priority image data of the objects (step S24). That is, the R, G, B values of the key object are inserted in the position of address P+1 in the lookup table 16, and the previous contents at address p+1 and subsequent addresses are each moved one address back. In the example shown in FIG. 10, since the designated priority P of the key object is "3", the R G, B values of the key object, i.e. [0, 0, 0] (black), are entered at the address "4" in the lookup table 16, and the previous addresses "4" to "6" are moved one stage down (or back). FIG. 15 schematically shows the lookup table 16 as updated.

When all the objects have been arranged, the operator ends the series of layout processing by manipulating the menus on the screen through the coordinate input device 11 (step S25). On the other hand, when different objects are fetched from the external storage 13 for arrangement, the operation returns to step S4 to repeat the same processing. When a key object is selected from the objects already recorded in the ground area, the priority image data of the objects are updated to be continuous, with the key object data excluded from the ground data. The key object data are written to the key object area, and processing similar to the described processing is carried out, whereby this key object may be moved and displayed between other objects with designated conditions.

The priorities and offsets of the objects laid out on the CRT screen as above are written to the simulation manager table 19 and transferred to a layout scanner along with the files of the respective objects stored in the external storage 13. The layout scanner carries out actual operations on the object data based on the simulation manager table 19, and subsequently outputs the data to a film or other medium.

In the foregoing embodiment, an ordinary microprocessor may be used as the CPU 14 to map the addresses of the image memory plane 15 in an address space of the CPU itself, or a DMA controller may be used to carry out the copying operations. Further, the described layout apparatus may employ a graphic controller having a function for conditionally copying the various image data, thereby achieving simplified hardware and a high-speed display of movement. The series of processes including unconditional and conditional copying in the image memory plane 15 and rewriting of the priority image data is carried out at high speed, which enables the key object to be moved and displayed between other objects in real time in response to operations of the coordinate input device 11 and priority setter 12.

In the above embodiment, all the ground data in the ground area are copied to the other display work area (which is making no contribution to display) when an instruction is given to move the key object or change its priority. Where the key object is relatively small, the ground data may be copied and reinstated only for the region of the display work area where conditional copying was made previously. This process will provide a faster processing speed than copying of all the ground data.

Second Embodiment

Figure 16:
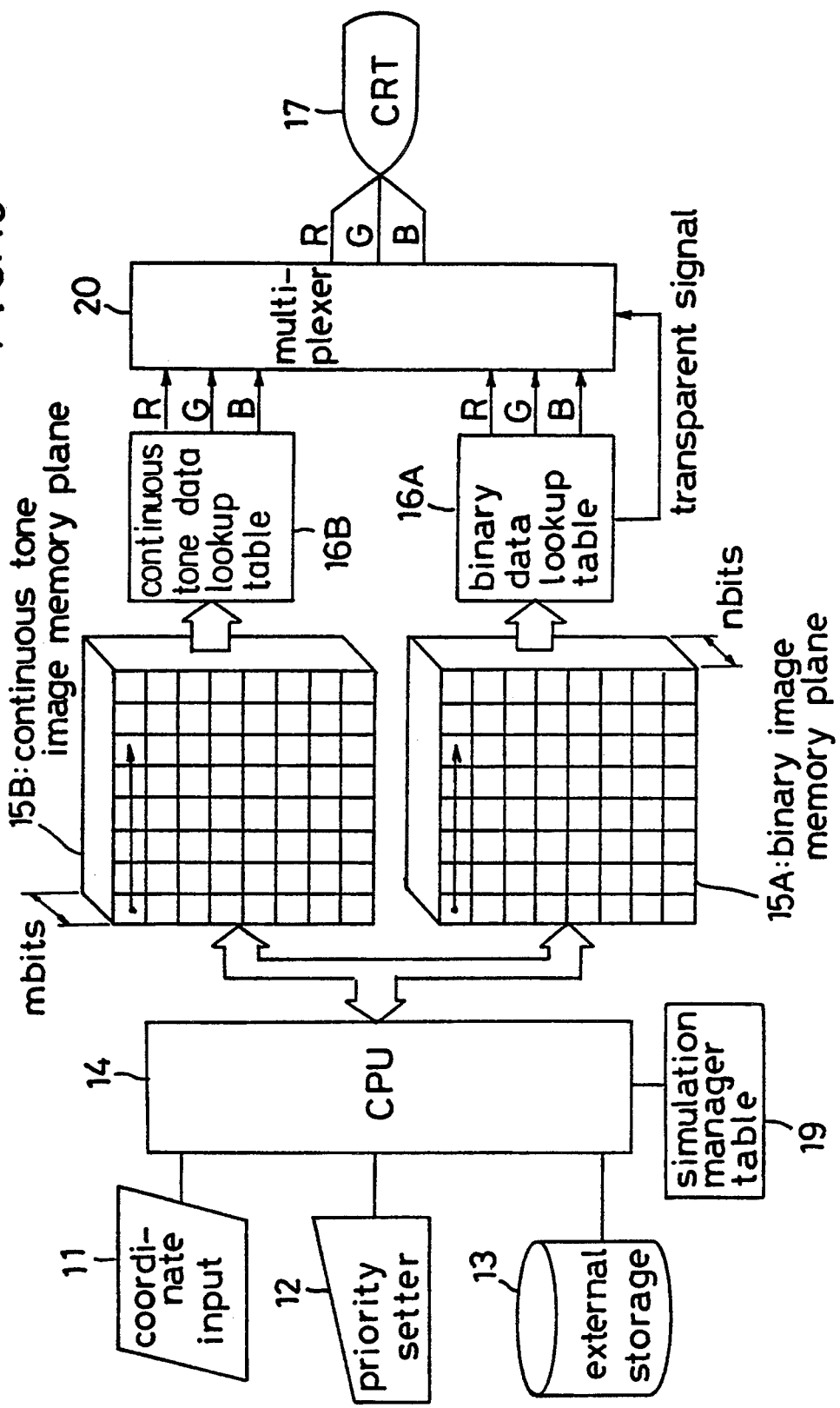
FIG. 16 is a block diagram showing an outline of an image layout processing apparatus in a second embodiment of the present invention.

This embodiment is a layout processing method which handles a plurality of objects to be laid out, including black and white continuous tone images besides binary images such as graphics and characters. FIG. 16 is a block diagram showing an outline of a layout processing apparatus for implementing the processing method in this embodiment. In FIG. 16, like reference numerals are used to identify like parts in the first embodiment, which will not be described again.

The external storage 13 used in this embodiment stores binary image objects such graphics, characters and the like as in the first embodiment, and continuous tone image objects such as pictures. Data of the continuous tone image objects include binary data representing regions of the continuous tone image objects (mask data) and continuous tone data. The continuous tone data of the continuous tone image objects are digital image data inputted through a scanner or a CCD camera, or multitone data generated from a computer or the like. In this embodiment, the continuous tone data are expressed in $m-1$ bits (m: positive integers).

The layout processing apparatus in this embodiment includes an image memory plane 15A for the binary images, and an image memory plane 15B for the continuous tone images. The binary images may be expressed in priority image data as described in the first embodiment, but the continuous tone images cannot because they have continuous tone pixels. Thus, the image memory plane 15A for the binary images is used for storing, besides the priority image data of the binary images, the priority mask data for indicating only the regions of the continuous tone images along with their priorities. The image memory plane 15B is used for storing the continuous tone data which will replace the priority mask data. The image memory plane 15B has an m-bit depth for the $m-1$ bit continuous tone data. As will be described later, the most significant bit (MSB) of the image memory plane 15B provides condition data for use in copying continuous tone key object data from a key object area to a display work area. To speak in terms of picture image, this corresponds to a mask showing a copying region.

Each of the image memory planes 15A and 15B includes a ground area, a key object area, a display work area "1" and a display work area "2" as described with reference to FIG. 3. The respective areas of the image memory plane 15A for the binary images are hereinafter referred to as a binary ground area, a binary key object area, and binary display work areas "1" and "2", and those of the image memory plane 15B for the continuous tone images as a continuous tone ground area, a continuous tone key object area, and continuous tone display work areas "1" and "2".

The image memory planes 15A and 15B are synchronously raster-scanned. The priority image data of the binary image objects and the priority mask data of the continuous tone image objects read from the image memory plane 15A are applied to a lookup table 16A. The continuous tone data of the continuous tone image objects read from the image memory plane 15B are applied to a continuous tone data lookup table 16B.

As shown in FIG. 17, the binary data lookup table 16A outputs R, G, B values and transparent signals corresponding to the priority data received. This lookup table 16A is operable by ON/Off switching of a transparent bit so that the transparent signals are not outputted upon receipt of the priority data of the binary image objects, and are outputted upon receipt of the priority mask data of the continuous tone images. Functions of the transparent signal will be described later.

As shown in FIG. 18, the continuous tone data lookup table 16B outputs R, G, B values corresponding to input data (continuous tone data) applied thereto as addresses. The R, G, B values at the respective addresses are the same since, in this embodiment, the continuous tone images are displayed in black and white tones. The upper half (addresses "0" to "$2^{m-1}-1$") and lower half (addresses "$2^{m-1}$" to "$2^m-1$") of the lookup table 16B have identical R, G, B values for output. This is because image data of the same tones must be outputted whether the MSB of the continuous tone data outputted from the continuous tone image memory plane 15B is "0" or "1" provided that the lower bits are the same.

The R, G, B values outputted from the lookup tables 16A and 16B are applied to a multiplexer 20. The multiplexer 20 outputs the R, G, B values received from the lookup table 16A to the CRT 17 when the transparent signal is off, and outputs those received from the lookup table 16B when the transparent signal is on.

The layout processing apparatus shown in FIG. 16 has a construction for handling objects including black and white continuous tone images. Where color continuous tone images are included in the objects, a continuous tone image memory plane may be provided for each color component R, G or B, with R, G, B output values from the memory planes directly applied to R, G, B inputs on a continuous tone data side of the multiplexer 20.

The term "binary" is used as necessary in describing this embodiment to mean "having two values corresponding to inside and outside of an image region". For example, the mask data of the continuous tone key object written to the binary key object area of the binary image memory plane 15A have "0" and "$2^n-1$" as described later.

Figure 19:
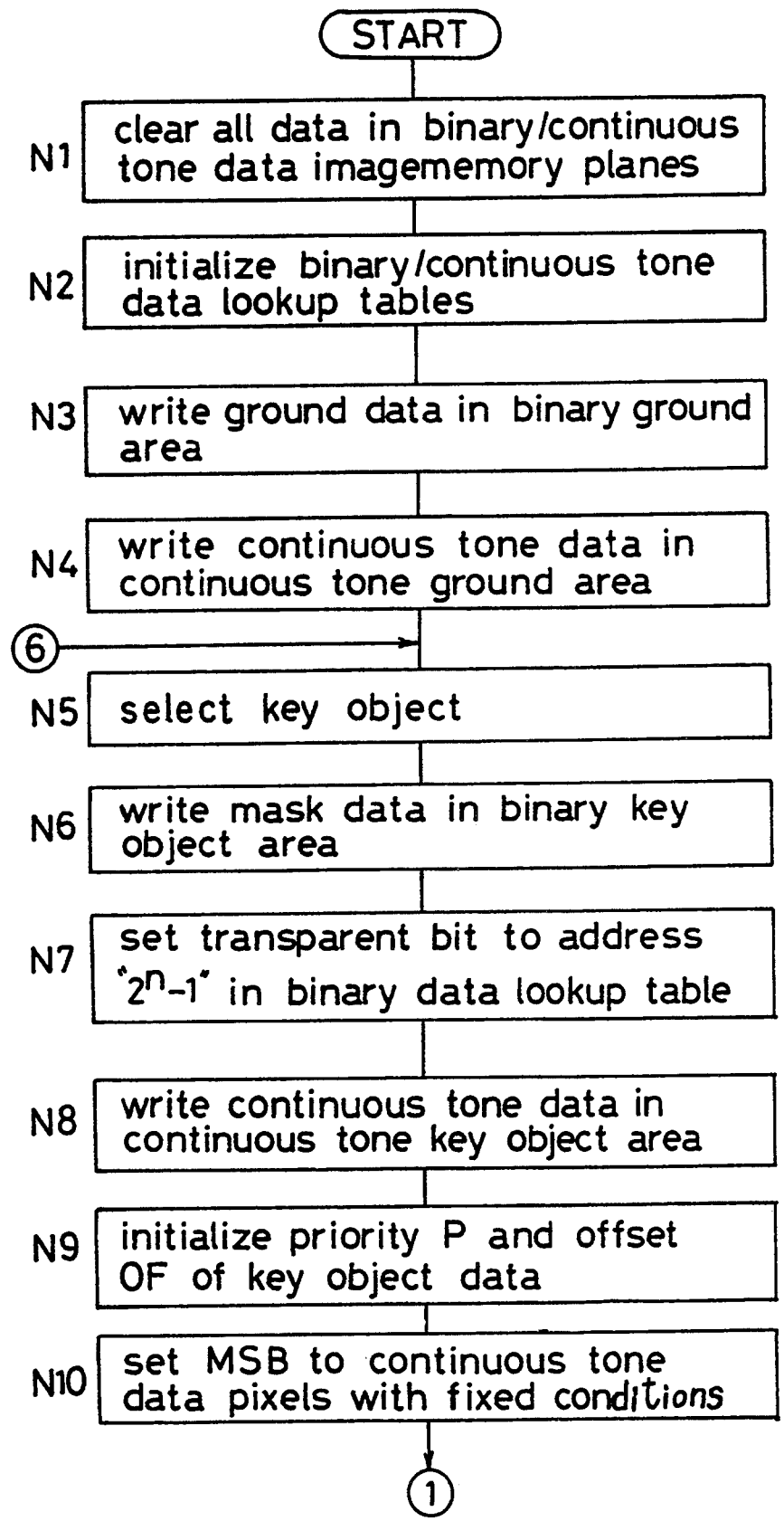
FIG. 19 is a partial flowchart of a processing sequence in the second embodiment.
Figure 20:
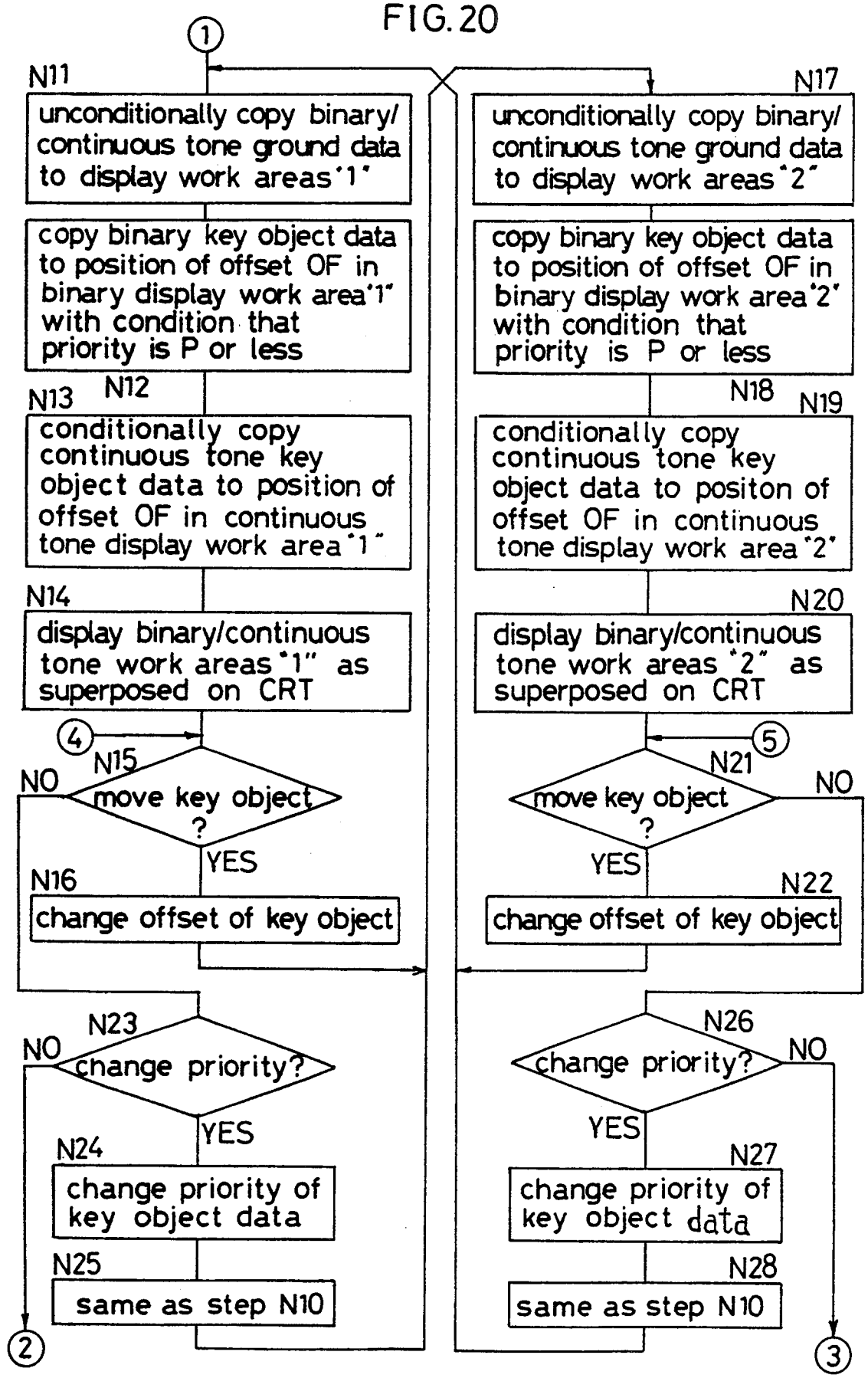
FIG. 20 is another partial flowchart of the processing sequence in the second embodiment.
Figure 21:
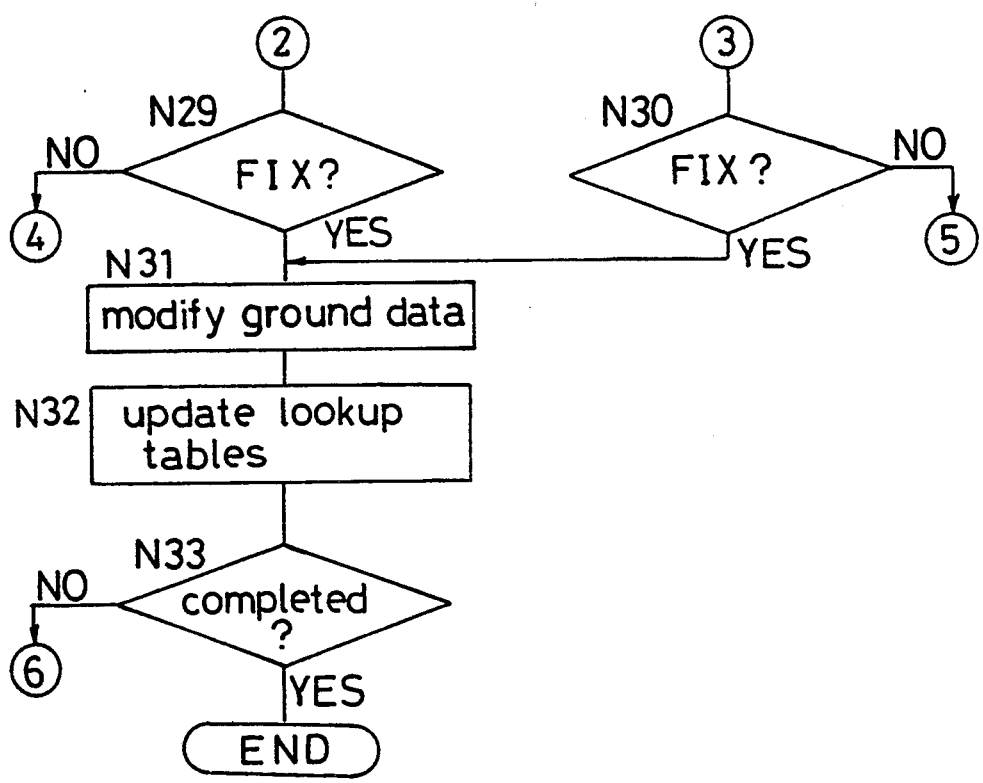
FIG. 21 is a further partial flowchart of the processing sequence in the second embodiment.

Operations of the layout processing apparatus in the second embodiment will be described with reference to the flowchart shown in FIGS. 19 through 21.

First, all data in the image memory planes 15A and 15B are cleared, and the R, G, B values of the lookup tables 16A and 16B are initialized with reference to the simulation manager table 19 (steps N1 and N2). If the objects are binary image objects at this time, the transparent bit at the corresponding addresses in the lookup table 16A is set to OFF [0]. If the objects are continuous tone image objects, the transparent bit is set to ON [1].

Figure 22:
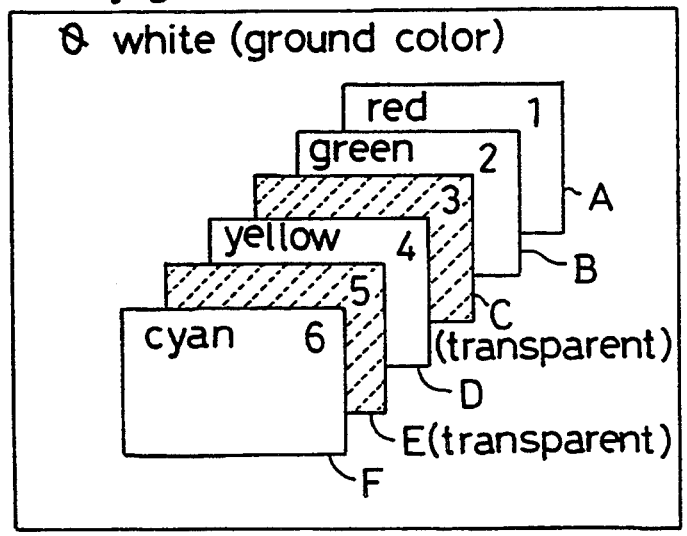
FIG. 22 is a schematic view of ground data written to a binary ground area.

Next, the CPU 14 successively reads objects data such as of characters, graphics, picture masks and the like except those of a key object from the external storage 13. After all these data are converted into binary images, priority data are established in the order designated by the operator as in the first embodiment, and written to the ground area (hereinafter referred to as a binary ground area) of the image memory plane 15A (step N3). FIG. 22 shows an example of ground data written to the binary ground area. In FIG. 22, references A, B, D and F denote regions of the priority data of the binary image objects. References C and E denote regions of the priority mask data of the continuous tone image objects. The priority data of the binary image objects and the priority mask data of the continuous tone images are herein collectively called "binary ground data".

Next, the continuous tone data of the continuous tone image objects are read from the external storage 13, and written to positions corresponding to the priority mask data of the continuous tone image objects in the continuous tone ground area of the continuous tone image memory plane 15B (step N4). These continuous tone data may be written by one of the following two methods, for example:

(1) ON/OFF of each pixel of the priority mask data is determined, and the continuous tone data of picture pixels corresponding to ON pixels are successively written to corresponding positions in the continuous tone ground area.

(2) The MSB is set to the data of ON pixels among the priority mask data, and these data are written to corresponding positions in the continuous tone ground area. Then, these data are replaced by the corresponding continuous tone data with respect only to the pixels in the continuous tone ground area to which the MSB is set. Since the MSB is not set to the original continuous tone data, the MSB is cleared from all the ground data in the continuous tone ground area after the replacement by the continuous tone data.

Figure 23:
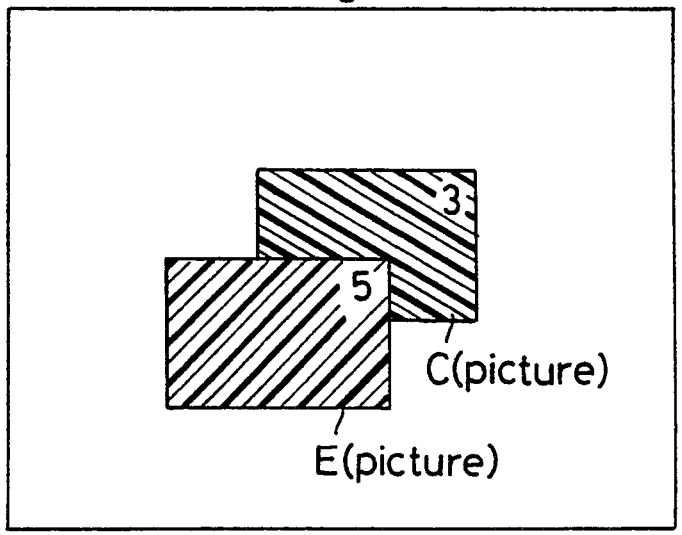
FIG. 23 is a schematic view of continuous tone data written to a continuous tone ground area.

FIG. 23, schematically shows the continuous tone data of continuous tone image objects C and E written to the continuous tone ground area. As seen, the continuous tone image object E of higher priority is superposed on the continuous tone image object C of lower priority.

Next, the operator fetches a key object from the external storage 13 by manipulating the menus on the screen through the coordinate input device 11 (step N5). If the key object fetched is in binary data, only the binary image memory plane 15A may be operated to move and display the key object between other objects and to determine its priority as in the first embodiment. This operation will not be described.

If the key object is in continuous tone data, the key object is moved and displayed between other objects as follows. A continuous tone image selected as the key object (hereinafter referred to as a continuous tone key object) may be one already written to the ground areas. In this case, as in the first embodiment, the respective key object data must be removed from the binary and continuous tone ground areas to rewrite the ground data.

Figure 24:
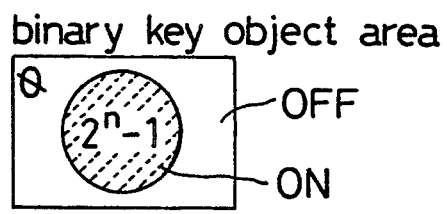
FIG. 24 is a schematic view of mask data written to a binary key object area.

As shown in FIG. 24, the mask data of the continuous tone key object fetched from the external storage 13 are converted into "$2^n-1$", and written to the binary key object area of the binary image memory plane 15A (step N6). Then, the transparent bit at address "$2^n-1$" in the binary data lookup table 16A is set to ON [1] (step N7). In the lookup table 16A shown in FIG. 17, the transparent bit at address "7" is set to [1].

Figure 25:
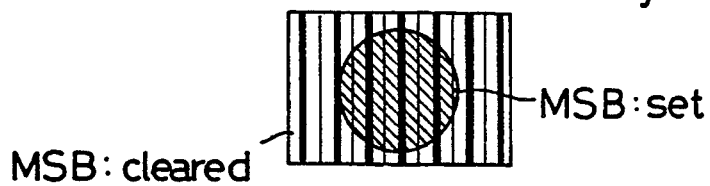
FIG. 25 is a schematic view of continuous tone data written to a continuous tone key object area.

Next, the continuous tone data of the key object is fetched from the external storage 13, and written to the continuous tone key object area of the continuous tone image memory plane 15B (step N8). The continuous tone key object data are written in the same manner as the ground data. At this time, as shown in FIG. 25, the MSB is set to the continuous tone data for the pixels in the continuous tone key object area corresponding to the pixels in the binary key object area where the mask data are ON, and is cleared for the pixels corresponding to the pixels where the mask data are OFF. This is because, as described later, the MSB in the continuous tone key object data is used as a mask when conditionally copying the continuous tone key object data from the continuous tone key object area to the continuous tone ground area of the same memory plane.

Next, the operator operates the priority setter 12 to initialize priority P of the continuous tone key object data, and operates the coordinate input device 11 to initialize offset OF of the continuous tone key object data from the mechanical (step N9). In the subsequent processing, the continuous tone key object enters between the object having priority P and the object having priority P+1, and moves with variations in the offset OF.

Figure 26:
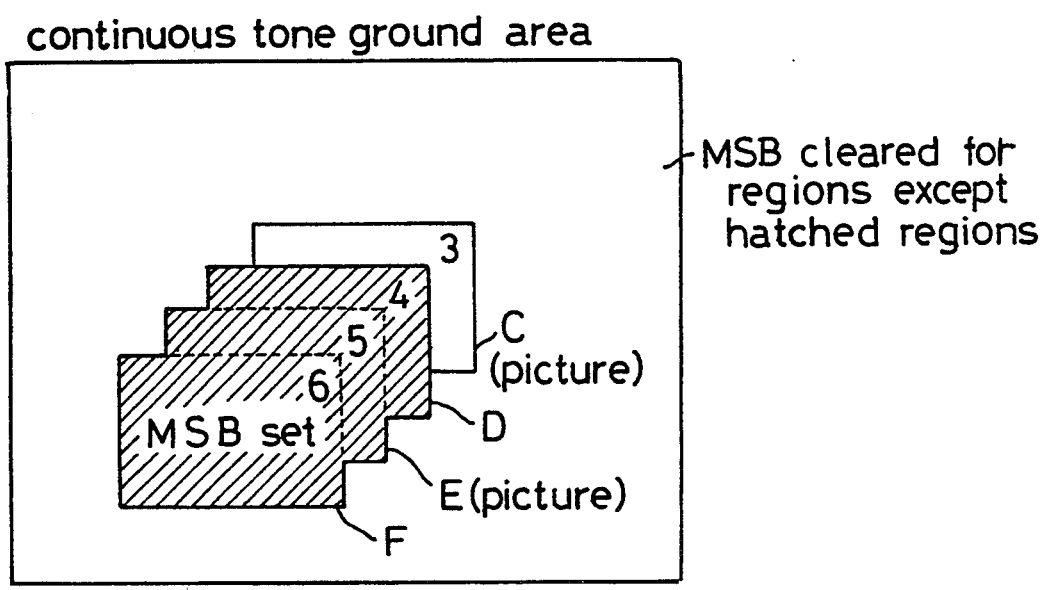
FIG. 26 is a schematic view showing regions in the continuous tone ground area where the MSB is set.

The CPU 14 reads the ground data from the binary ground area, and compares levels of the priority data or priority mask data of the respective pixels with "P+1". For the pixels higher than "P+1", the MSB is set to the corresponding pixels in the continuous tone ground area and, for the other pixels, the MSB is cleared (step N10). Assuming that the priority of the continuous tone key object is set to "3" at step N9, the MSB is set to the object regions D, E and F in the continuous tone ground area having priorities "4", "5" and "6" as shown in FIG. 26.

Next, the CPU 14 copies the ground data unconditionally from the ground areas of the image memory planes 15A and 15B to the respective display work areas "1" (step N11). Then, the CPU 14 copies the mask data "$2^n-1$" from the binary key object area to a position of offset OF in the binary display work area "1" (step N12). This copying is carried out with the condition that, for pixels in the binary key object area having mask data other than "0" (i.e. having mask data "$2^n-1$"), the mask data are copied to corresponding pixel positions in the binary display work area "1" only if the priority data of these pixels are P or less.

Figure 27:
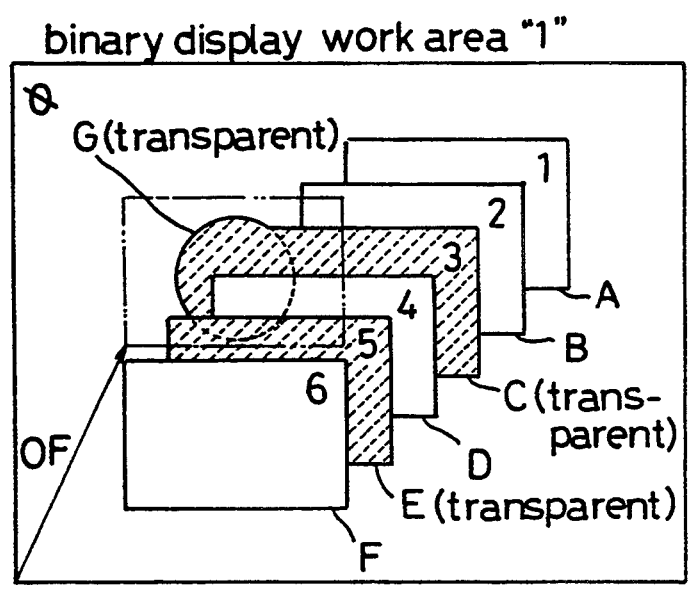
FIG. 27 is a schematic view of data written to a binary display work area "1"

FIG. 27 schematically shows the data conditionally copied to the binary display work area "1" where the continuous tone key object G has priority "3". In the example shown in FIG. 27, the mask of key object G lies between objects C and D and its portion (the $2^n-1$ data region) is blank since, as described hereinbefore, the transparent bit is set to address "$2^n-1$" in the binary data lookup table 16A. The regions of objects C and E in the binary display work area "1" are transparent as is the region of the key object G since objects C and E are continuous tone images as noted hereinbefore.

At the next step N13, the CPU 14 copies the continuous tone key object data (FIG. 25) from the continuous tone key object area to a position of offset OF in the continuous tone display work area "1". This copying is carried out with the condition that, for pixels in the continuous tone key object data to which the MSB is set, the continuous tone key object data are copied to corresponding pixel positions in the continuous tone display work area "1" only if the MSB is not set to these pixels.

Figure 28:
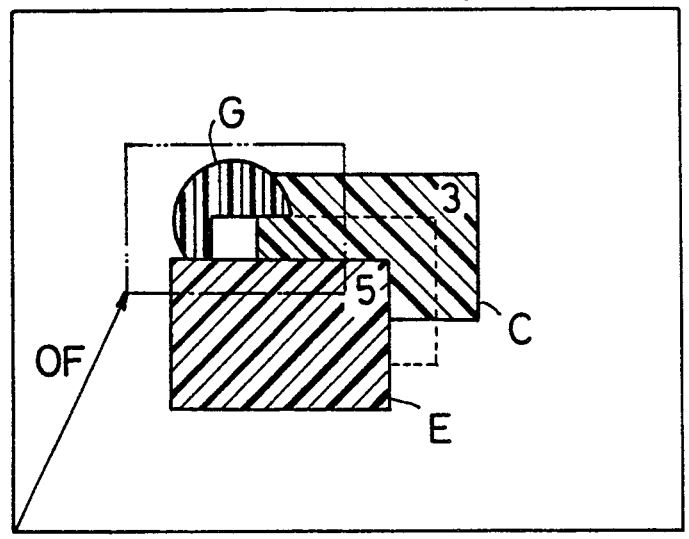
FIG. 28 is a schematic view of data written to a continuous tone display work area "1"

FIG. 28 schematically shows data conditionally copied to the continuous tone display work area "1" when the key object G has priority "3". It will be seen from a comparison between FIG. 28 and FIG. 27 that the shape of the continuous tone data of key object G in the continuous tone display work area "1" coincides with the transparent shape of the mask data of key object G in the binary display work area "1".

After copying the ground data and key object data from the binary display work area "1" and continuous tone display work area "1", respectively, the CPU 14 sets raster scan starting addresses to the binary and continuous tone display work areas "1" and synchronously reads the data from the two display work areas "1" (step 14).

The priority data of the binary images read from the binary display work area "1" are converted by the binary data lookup table 16A into predetermined R, G, B values to be displayed on the CRT 17 through the multiplexer 20. The priority mask data of the continuous tone image objects and the mask data of the continuous tone key object read from the binary display work area "1" are converted by the binary data lookup table 16A into the transparent signals to be applied to the multiplexer 20.

Upon receipt of the transparent signals, the multiplexer 20 selects the R, G, B values outputted from the continuous tone data lookup table 16B, and outputs the selected values to the CRT 17. Some of the continuous tone data outputted from the continuous tone display work area "1" have the MSB set thereto, and others do not. As shown in FIG. 18, the continuous tone data lookup table 16B outputs the same R, G, B values if the bits other than the MSB are the same. Consequently, the MSB imparts no influence on the tones of the continuous tone images.

Figure 29:
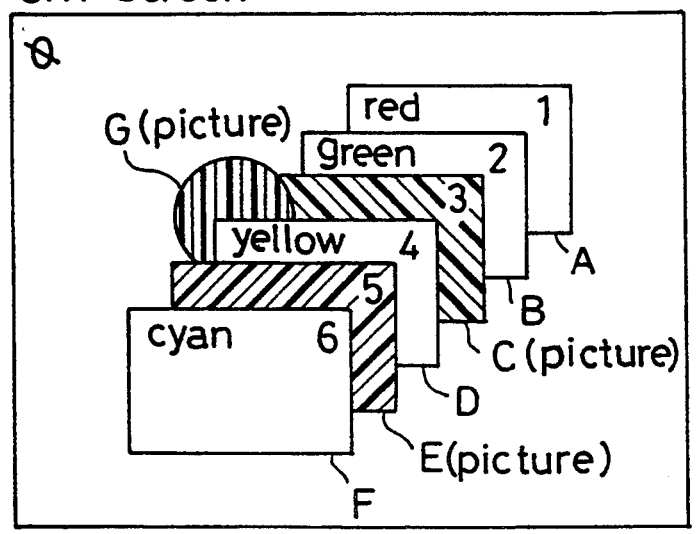
FIG. 29 is a schematic view of a display made on a CRT screen.

FIG. 29 shows an example of layout displayed on the CRT 17 at this time. The continuous tone key object G is shown as inserted between the continuous tone image object C having priority "3" and the binary image object D having priority "4".

When the operator instructs movement of the key object G through the coordinate input device 11 (step N15), the CPU 14 successively processes the binary and continuous tone display work areas "2" as at steps N11 through N14 to move and display the key object between other objects (steps N17-N20).

The operator may give an instruction through the priority setter 12 to change the priority of the key object when the contents of the binary and continuous tone display work areas "1" are displayed (step N23). Then, the CPU 14 changes the priority of the key object data (step N24), carries out the same operation as at step N10 (step N25), and executes step N17 and subsequent steps for carrying out a series of operations on the binary and continuous tone display work areas "2".

An instruction may be given to move the key object or change the priority thereof when the contents of the binary and continuous tone display work areas "2" are displayed. Then, the CPU 14 rewrites the data in the binary and continuous tone display work areas "1". As in the first embodiment, flickering on the display screen due to data rewriting may be avoided by alternately using the binary/continuous tone display work areas "1" and "2" for data rewriting.

When the key object has moved to a desired position, the operator manipulates the menus on the screen through the coordinate input device 11 to input a FIX instruction as in the first embodiment (steps N29 and N30). The ground data are revised as a result (step S31). The same processing takes place as in the first embodiment when the FIX instruction is given in relation to a key object in binary data. If the key object is in continuous tone data, the same processing is executed for the mask data as for the binary data, and a series of operations may be carried out to rewrite the continuous tone ground data all over again, or the continuous tone ground data may be renewed by unconditionally copying the data present in the continuous tone display work areas at the time the FIX instruction is given, to the continuous tone ground area.

After revision of the ground data, an operation is carried out to update the lookup table 16A (step N32). This operation is the same as in the first embodiment, and will not be described again.

When all the objects have been arranged, the operator ends the series of layout processing by manipulating the menus on the screen through the coordinate input device 11 (step N33). On the other hand, when different objects are fetched from the external storage 13 for arrangement, the operation returns to step N5 to repeat the same processing. The priorities and offsets of the objects obtained as above are stored in the simulation manager table 19 as in the first embodiment.

The series of processes including unconditional and conditional copying in the binary and continuous tone image memory planes 15A and 15B and display work area switching are carried out at high speed, which enables the key object to be moved and displayed between other objects in real time in response to instructions to move the key object and to change its priority, or allows overlapping relations to be changed, as in the first embodiment.

High-speed processing is possible also where the continuous tone data are used, as in the first embodiment, by limiting regions for unconditionally copying the ground data.

In this embodiment, the single CPU 14 carries out the copying operations for the binary and continuous tone image memory planes 15A and 15B. However, conditional copying hardware using a DMA controller, or a graphic controller having a conditional copying function may be provided for each of the image memory planes 15A and 15B to carry out unconditional and conditional copying concurrently. This will further shorten the processing time.

Further, in this embodiment, ON/OFF of the MSB added to the continuous tone ground data and continuous tone key object data is used as a mask for determination purposes in the conditional copying. Therefore, the logic of MSB set/clear may be the opposite of what is employed in the embodiment.

The present invention may be embodied in other specific forms without departing from the spirit or essential attributes thereof and, accordingly, reference should be made to the appended claims, rather than to the foregoing specification, as indicating the scope of the invention.

What is claimed is:

1. An image layout processing method for simulating on a display screen an arrangement of a plurality of binary image objects to be transferred to a prepress layout sheet, said method comprising:

a first step of converting data of the objects other than a key object into priority data assigned to the objects and corresponding to predetermined priorities, and successively writing said priority data to designated positions in a ground area acting as storage means in superposition in order of said priorities;

a second step of converting data of said key object to appropriate key object data determined in relation to said priority data, and writing the key object data to a key object area acting as a further storage means;

a third step of unconditionally copying said priority data from said ground area to a display work area acting as a still further storage means;

a fourth step of comparing a priority assigned to said key object with said priority data of the objects in said display work area when copying said key object data from said key object area to a designated position in said display work area, and copying said key object data in said key object area corresponding to the pixels in said display work area to positions of the pixels in said display work area when the priority data of the pixels in said display work area are substantially lower than the priority of said key object; and a fifth step of successively reading data of the pixels in said display work area resulting from the fourth step, and converting the data into predetermined color data for presentation on display means.

2. An image layout processing method as defined in claim 1, wherein said display work area is divided into two subareas for alternate use in executing the third through fifth steps when an instruction is given to change the priority of said key object.

3. An image layout processing method as defined in claim 1, wherein said display work area is divided into two subareas for alternate use in executing the third through fifth steps when an instruction is given to move said key object.

4. An image layout processing apparatus for simulating on a display screen an arrangement of a plurality of binary image objects to be transferred to a prepress layout sheet, said apparatus comprising:

external storage means for storing data of the plurality of binary image objects;

object designating means for separately designating a key object and other desired objects from the binary image objects stored in said external storage means;

object position indicating means for indicating positions of designated objects on the mechanical;

first data conversion means for converting data of the objects designated by said object designating means and read from said external storage means into priority data corresponding to predetermined priorities for superposition;

ground data storage means for storing the priority data (ground data) of the objects other than the key object obtained form said first data conversion means and successively superposed in an order of priority in the positions indicated by said object position indicating means;

key object data storage means for storing the priority data (key object data) of the key object obtained from said first data conversion means;

priority assigning means for assigning a priority to said key object;

display storage means for storing data read from said ground data storage means and said key object data storage means;

write control means for copying the ground data intact (unconditionally) from said ground data storage means to said display storage means, and subsequently copying the key object data from said key object data storage means to said display storage means with a condition that, when a comparison between the priority assigned to said key object and the priority data (ground data) of the objects in said display memory means shows that the priority data of the pixels in said display memory means are substantially lower than the priority assigned to said key object, said key object data in said key object data storage means are copied to positions of the pixels in said display storage means;

second data conversion means for converting pixel data stored in said display storage means into color data; and display means for displaying the color data obtained from said second data conversion means.

5. An image layout processing apparatus as defined in claim 4, wherein said display storage means includes two display work areas to be used alternately when an instruction is given to change the priority of said key object.

6. An image layout processing apparatus as defined in claim 4, wherein said display storage means includes two display work areas to be used alternately when an instruction is given to move said key object.

7. An image layout processing method for simulating on a display screen an arrangement of a plurality of image objects including continuous tone image objects to be transferred to a prepress layout sheet, said method comprising:

a first step of superposing priority data fixed to binary image objects other than a key object and corresponding to predetermined priorities for superposition, and priority mask data of continuous tone image objects other than the key object, successively in an order of priority on designated positions in a binary ground area acting as storage means;

a second step of superposing continuous tone data of continuous tone image objects other than said key object in the order of priority on designated positions in a continuous tone ground area acting as a further storage means;

a third step of writing mask data of said key object in a binary key object area acting as a still further storage means when said key object is a continuous tone image object;

a fourth step of writing continuous tone data of said key object in a continuous tone key object area acting as a still further storage means, and setting the most significant bit (MSB) of the continuous tone data in said continuous tone key object area corresponding to pixels in said binary key object area having the mask data in ON state, when said key object is a continuous tone image object;

a fifth step of reading the priority data and priority mask data from said binary ground area (the two types of data being hereinafter collectively called binary ground data), comparing the binary ground data of respective pixels with the priority assigned to said key object, and setting the most significant bit (MSB) to pixels in the continuous tone ground area corresponding to said pixels when the binary ground data are substantially higher than the priority assigned to said key object;

a sixth step of unconditionally copying the data from said binary ground area and said continuous tone ground area to a binary display work area and a continuous tone display work area acting as still further storage means, respectively;

a seventh step of copying the mask data from said binary key object area to a designated position in said binary display work area such that, when the binary ground data in said binary display work area are substantially lower than the priority assigned to said key object, the mask data in the binary key object area corresponding to said pixels are copied to corresponding pixel positions in said binary display work area;

an eighth step of copying the continuous tone key object data from said continuous tone key object area to a designated position in said continuous tone display work area such that the continuous tone data of the pixels to which the most significant bit (MSB) of the continuous tone key object data is set are copied only to positions of pixels in the corresponding continuous tone display work area to which the most significant bit (MSB) is not set; and a ninth step of synchronously reading data of said binary display work area and said continuous tone display work area resulting from the seventh and eighth steps such that, when the data read from said binary display work area are the priority data of the binary image objects, the priority data are converted into predetermined color data for display on display means, and when the data read from said binary display work area are the priority mask data of the continuous tone image objects and the mask data of the key object, continuous tone images are displayed on the display means based on the continuous tone data read from said continuous tone display work area.

8. An image layout processing method as defined in claim 7, wherein a first and a second binary display work areas are used as said binary display work area and a first and a second continuous tone display work areas are used as said continuous tone display work area, a group of the first binary/continuous tone display work areas forming a pair and a group of the second binary/continuous tone display work areas forming a different pair being used alternately in executing the fifth through ninth steps when an instruction is given to change the priority of said key object, and the two groups of the binary/continuous tone display work areas being used alternately in executing the sixth through ninth steps when an instruction is given to move said key object.

9. An image layout processing apparatus for simulating on a display screen an arrangement of a plurality of image objects including continuous tone image objects to be transferred to a prepress layout sheet, said apparatus comprising:

external storage means for storing data of the plurality of image objects including binary image objects and continuous tone image objects, the data of said continuous tone image objects including mask data expressing regions of said continuous tone image objects in binary values, and continuous tone data;

object designating means for separately designating a key object and other desired objects from the objects stored in said external storage means;

object position indicating means for indicating positions of designated objects on the mechanical;

first data conversion means for converting the data of the binary objects and the mask data of the continuous tone image objects designated by said object designating means and read from said external storage means into priority data corresponding to predetermined priorities for superposition (priority data of the mask data being hereinafter called priority mask data);

binary ground data storage means for storing the priority data and priority mask data (hereinafter collectively called ground data) of the objects other than the key object obtained from said first data conversion means and successively superposed in an order of priority in the positions indicated by said object position indicating means;

continuous tone ground data storage means for storing the continuous tone data of the objects other than the key object designated by said object designating means and read from said external storage means, said continuous tone ground data being successively superposed in the order of priority in positions corresponding to the priority mask data stored in said binary ground data storage means;

continuous tone key object mask data storage means for storing, when the key object designated by said object designating means is a continuous tone image object, mask data of the continuous tone key object obtained from said first data conversion means;

continuous tone key object data storage means for storing, when the key object designated by said object designating means is a continuous tone image object, continuous tone data of the continuous tone key object read from said external storage means in positions corresponding to the mask data stored in said continuous tone key object mask data storage means, the most significant bit (MSB) being set to the continuous tone data in said continuous tone key object data storage means corresponding to pixels in said continuous tone key object mask data storage means having the mask data in ON state, the MSB being cleared for pixels corresponding to pixels having the mask data in OFF state;

priority assigning means for assigning a priority to said key object;

comparator means for comparing the ground data stored in said binary ground data storage means and the priority assigned to said key object by said priority assigning means, setting the MSB for pixels in said continuous tone ground data storage means corresponding to pixels of substantially higher priorities than said key object, and clearing the MSB for pixels corresponding to pixels of lower priorities;

binary display storage means for storing data read from said binary ground data storage means and said continuous tone key object mask data storage means;

continuous tone display storage means for storing data read from said continuous tone ground data storage means and said continuous tone key object data storage means;

first write control means for copying the binary ground data intact (unconditionally) from said binary ground data storage means to said binary display storage means, and subsequently copying the mask data from said continuous tone key object mask data storage means to said binary display storage means with a condition that, for pixels having the mask data stored in said continuous tone key object mask data storage means in ON state, the mask data are copied only to corresponding pixel positions in said binary display storage means having priority data substantially lower than the priority of said key object;

second write control means for copying the continuous tone ground data intact (unconditionally) from said continuous tone ground data storage means to said continuous tone display storage means, and subsequently copying the mask data from said continuous tone key object data storage means to said continuous tone display storage means with a condition that, for pixels to which the MSB of the continuous tone data of the continuous tone key object is set, the continuous tone data of the continuous tone key object are copied only to corresponding pixels in said continuous tone display storage means without the MSB set thereto;

second data conversion means for converting the priority data of the binary image objects stored in said binary display storage means into predetermined color data, and setting a transparent signal to OFF state, the transparent signal being set to ON state for the priority mask data of the continuous tone image objects and the mask data of the continuous tone key object.;

third data conversion means for converting the continuous tone data of the continuous tone image objects stored in said continuous tone display storage means into predetermined color data;

data selecting means for selecting and outputting the color data of the binary image objects outputted from said second data conversion means when the transparent signal outputted from said second data conversion means is in OFF state, and selecting and outputting the color data of the continuous tone image objects outputted from said third data conversion means when the transparent signal is in ON state; and display means for displaying the color data outputted from said data selecting means.

10. An image layout processing apparatus as defined in claim 9, wherein said binary display storage means includes a first and a second binary display work areas, and said continuous tone display storage means includes a first and a second continuous tone display work areas, a group of the first binary/continuous tone display work areas and a group of the second binary/continuous tone display work areas being used alternately when an instruction is given to change the priority of said key object or to move said key object.

* * * * *